United States Patent [19]

Krawczak

[11] Patent Number: 5,507,517
[45] Date of Patent: Apr. 16, 1996

[54] NUT AND WASHER ASSEMBLAGE FOR BUSHING

[75] Inventor: Lawrence E. Krawczak, Sterling Heights, Mich.

[73] Assignee: Chrysler Corporation, Highland Park, Mich.

[21] Appl. No.: 294,157

[22] Filed: Aug. 22, 1994

[51] Int. Cl.$^6$ .............................. B60G 7/02; F16B 37/08
[52] U.S. Cl. .......................... 280/690; 280/673; 411/533; 411/432
[58] Field of Search .................. 280/690, 701, 280/673; 411/533, 432, 428, 534

[56] References Cited

U.S. PATENT DOCUMENTS

| | | | |
|---|---|---|---|
| 515,089 | 2/1894 | McClelland | 411/533 X |
| 2,672,069 | 3/1954 | Mitchell | 411/533 X |
| 2,679,880 | 6/1954 | Poupitch | 411/533 X |
| 3,800,396 | 4/1974 | Puchner | 411/368 X |
| 4,575,114 | 3/1986 | Camp | 280/673 |
| 4,812,094 | 3/1989 | Grube | 411/533 X |
| 4,940,377 | 7/1990 | Reynolds | 411/432 |
| 4,969,788 | 11/1990 | Goiny | 411/533 X |
| 4,986,712 | 1/1991 | Fultz | 411/533 X |

*Primary Examiner*—Josie Ballato
*Attorney, Agent, or Firm*—G. Andrew Barger

[57] ABSTRACT

A three element fastening assemblage comprising a nut formed with a head end and a collared end, a dished-shaped washer and a retaining strap having a circular aperture aligned on the strap longitudinal axis of symmetry. The washer central base has its seating surface axially depressed from a radially extending peripheral washer flange facing surface. The retainer strap has oppositely extending bifurcated ends defining pairs of washer retention prongs the distal ends of which are pre-bent to extend normally from a facing surface of the strap. The nut is initially positioned with its head end extending through the strap aperture with the nut collar providing a stop shoulder contacting the strap facing surface. With the strap facing surface in flush contact with the washer facing surface the prong distal ends are reverse bent about the washer flange circular edge thereby capturing the nut collar between the strap facing surface and the washer seating surface. The assemblage enables rotation of the nut relative to the strap and washer about the strap principal axis.

4 Claims, 2 Drawing Sheets

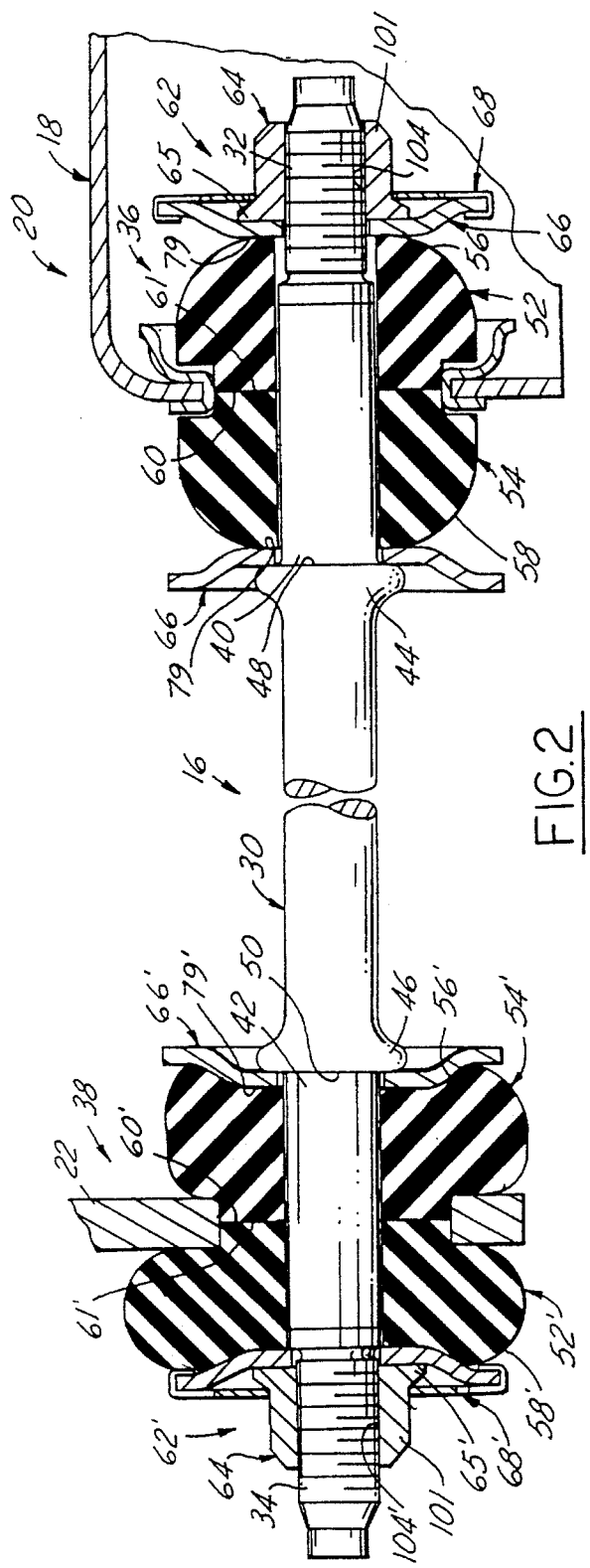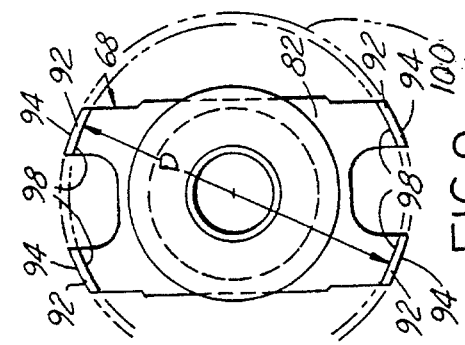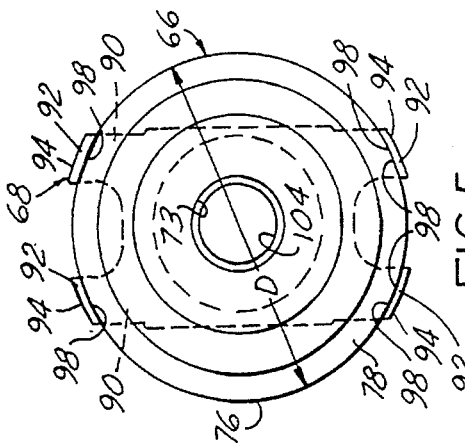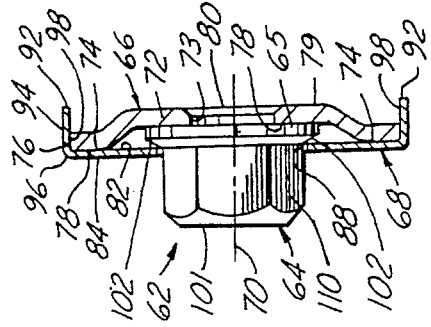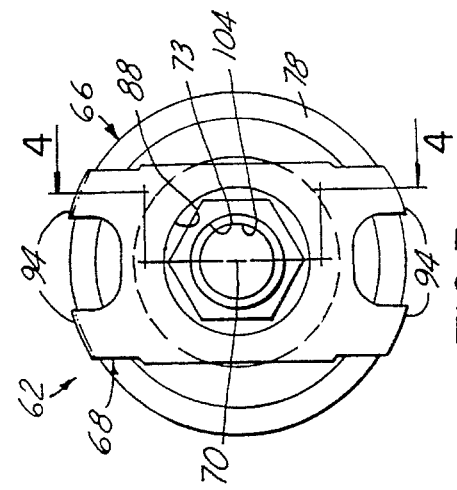

5,507,517

NUT AND WASHER ASSEMBLAGE FOR BUSHING

BACKGROUND OF THE INVENTION

This invention relates generally to a nut and washer fastening assembly and more particularly to a collared nut and a dish-shaped washer held in axially aligned assemblage by a retaining strap in a manner permitting rotation of the nut relative to the washer and strap.

Various nut and washer assemblies have been used to securely fasten members. An example of one such nut and washer fastening arrangement is shown in the U.S. Pat. No. 4,969,788 issued Nov. 13, 1990 to Goiny entitled Nut With Pressure Ring. The Goiny patent discloses a washer like pressure ring having a spherically shaped under surface for engagement with a depression complementary therewith in a component to be secured.

Other nut and washer fastener assemblies are known to embody interlocking arrangements, for example: McCelland U.S. Pat. No. 515,089; Mitchell U.S. Pat. Nos. 2,672,069; 2,679,880; 3,800,396; 4,812,094; 4,969,788; and 4,986,712.

SUMMARY OF THE INVENTION

Accordingly, it is an object of the present invention to provide a novel arrangement for readily and economically securing a collared nut and a dish-shaped washer in an axially aligned assemblage permitting the nut to rotate relative to the washer in a concentric manner seated on the recessed central base of the washer.

It is another object of the invention to provide a three element assemblage comprising a collared nut, a dish-shaped washer and a retaining strap wherein the strap is operative to secure the nut and washer in a self-centering manner thereby insuring that the washer will not be omitted upon the nut being threaded on a rod member or the like.

It is still another object of the present invention to provide a three element collared nut, dished-shaped washer and retaining strap assemblage for readily anchoring a bushing member on the threaded end of a rod while insuring that the washer, formed with a generally concavo-convex shaped central base, will be axially facing in its designed orientation.

DESCRIPTION OF THE DRAWINGS

Further objects, features, and advantages of the invention will become apparent to those skilled in the art upon reference to the following description and accompanying drawings in which:

FIG. 2 is a fragmentary enlarged cross sectional view of the tension strut taken on the line 2—2 of FIG. 1 showing an un-torqued bushing on one end and a torqued bushing on the opposite end;

FIG. 3 is an exterior end face detail view of the nut and torqued bushing washer held in their axially aligned relationship by a retainer prior to the bending thereof;

FIG. 4 is a vertical sectional view taken substantially on the line 4—4 of FIG. 3;

FIG. 5 is a plan view of the elements viewed in the direction of arrow "5" in FIG. 4;

FIG. 9 is a detail plan view of the retainer strap with the prong distal end portions pre-bent prior to assembly.

DETAILED DESCRIPTION OF THE INVENTION

Figure 1:
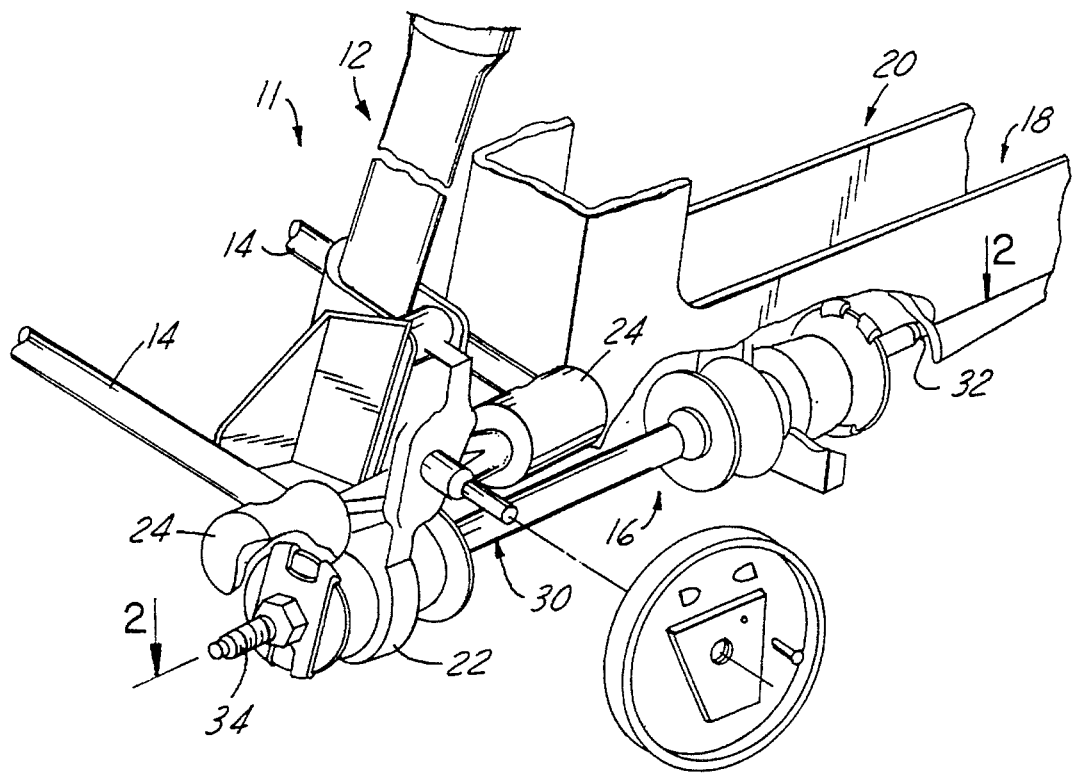
FIG. 1 is a fragmentary perspective view, with some parts exploded, of a vehicle suspension strut damper and leading tension strut.

Referring now to the drawings FIG. 1 illustrates a portion of an automotive vehicle frame 10 partially supporting an independent rear suspension arrangement 11. The suspension arrangement 11 comprises a damper strut shock absorber assembly 12, a pair of lateral control arms 14, and a trailing tension rod assembly 16. The tension arm assembly 16 has its forward end secured to a longitudinal frame member 18 of vehicle chassis 20. The pair of control arms 14 are each secured at their outboard ends to rear wheel support 22 by means of an associated resilient bushing 24 while each inboard end is suitably connected to a portion of the chassis (not shown).

With reference to FIG. 2 the rear suspension tension rod assembly 16 comprises a tension strut rod 30 having forward and aft threaded ends 32 and 34, respectively. The tension rod 30 has forward 36 and aft 38 bushing assemblies concentrically disposed on forward 40 and aft 42 rod spindles. Each spindle 40 and 42 extends axially from an associated forward 44 and aft 46 rod collar defining the intermediate torsion 30 rod therebetween. Each collar 44 and 46 is formed with oppositely facing forward and aft stop shoulders 48 and 50.

As the bushing assemblies 36 and 38 are substantially identical like reference numerals will be used to describe the pair of forward and aft bushing assemblies with the exception that the aft bushing assembly numerals will be primed.

As best seen in FIG. 2 each assembly 36 and 38 comprises a pair of elastomeric or rubber doughnut-shaped resilient bushings 52 and 54 that surround each spindle end 40 of the tension rod 30. In their normal or non-compressed state each pair of resilient bushings 52 and 54 are mirror images of each other having dome-shaped opposite exterior ends 56 and 58 and planar opposed flush interior ends 60 and 61.

Figures 6, 7, 8:
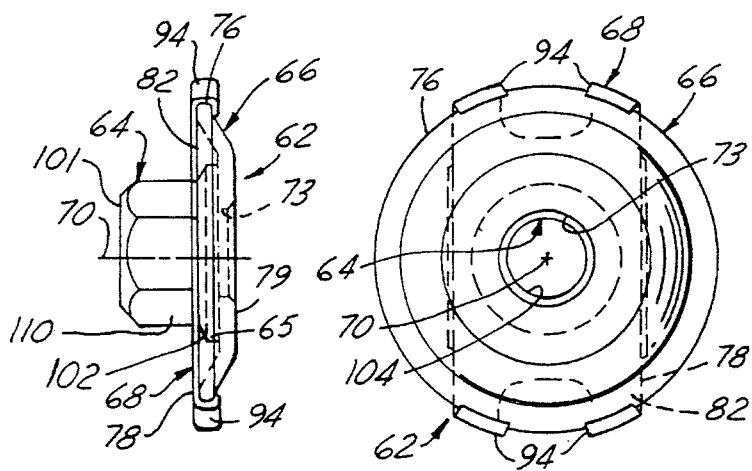
FIG. 6 is a side elevational view of the assembled nut, washer and retainer elements of FIGS. 3–5.
FIG. 7 is a plan view of the FIG. 6 assembly.
FIG. 8 is a detail plan view of the retainer blank element of the assembly.

FIG. 2 shows each bushing assembly 36 and 38 has an outer three element assemblage 62 comprising a collared nut 64, formed at its one seating end with annular collar 65, a dish-shaped annular washer 66 and an apertured retainer strap 68. With reference to FIGS. 6 and 7 each assemblage 62 is held in axially aligned relationship by the strap 68. This arrangement allows rotation of the collared nut 64 relative to the washer about principal axis 70 of the washer.

As best seen in FIG. 4 each dish-shaped washer 66 is formed with a depressed central base 72, having a concentric circular washer hole 73. The depressed washer base 72 is surrounded by a radially extending peripheral flange 74 terminating in a circular free edge 76 having a predetermined diameter "D" (FIG. 5). The flange 74 has a facing surface 78 and a engagement surface 79. The central base 72 provides a depressed face 80 axially offset relative to the washer facing surface 78.

With reference to FIG. 8 the retention strap 68 is shown initially formed as a flat blank from suitable sheet material, such as steel, plastic or the like, having a facing surface 82 and outer surface 84 as shown in FIG. 4. The blank strap 68 is symmetrical about its longitudinal axis 86 and is formed with a central circular aperture 88 having its center aligned on the strap longitudinal axis of symmetry 86. The blank strap 68 has mirror image bifurcated ends defining oppositely extending pairs of washer retention prongs 90. Each prong has an arcuate free end 92 whereby the four ends 92 define a circle of predetermined radius having a center of curvature 93 coinciding with the center of the strap circular aperture 88.

With reference to FIG. 9 the strap is shown in its initially pre-bent form wherein each prong distal end portion 94 initially pre-bent ninety degrees about an arcuate bend. In FIG. 8 four arcuate bend lines, indicated by dashed lines 96, have a common center of curvature coinciding with the strap hole center 93, define four distal end prong portions 94. Upon the distal end portions 94 being bent ninety degrees normal to the strap facing surface 82, as seen in FIG. 4, each prong portion forms an arc of a circle such that their mutually opposed interior surfaces 98 define an imaginary cylinder.

The plan view of FIG. 9 shows the strap in its initial pre-bent mode wherein the four axially upstanding prong distal ends portions 94 establish four mutually opposed concave guide surfaces 98 which define an imaginary dashed-line cylinder envelope 100 of predetermined diameter "D". The diameter "D" is substantially equal to but slightly greater than the washer perimeter 76 diameter "D-1". By virtue of the above described arrangement the three element assemblage 62 is readily assembled by first inserting a torqued head end 101 of the nut 64 through the strap circular aperture 88. As seen in FIG. 4 the nut collar defines a conical-shaped annular shoulder 102 adapted to engage in a self-centering manner nut threaded bore 104 on the principal axis 70 of the strap circular aperture 88.

As a second step the washer 66 is slidably received within the strap cylindrical envelope 100, defined by the four mutually opposed concave surfaces 98 of the prong distal end portions 94. It will be seen in FIG. 4 that as a result of the above arrangement the washer hole 73 is aligned with the nut threaded bore 104.

As a third step the prong distal ends 94 are return bent, as seen in FIGS. 6 and 7, capturing the nut collar 65 between the strap facing surface 82 and the washer recessed facing surface 78. It will be noted that the axial spacing of the facing surfaces 82 and 78 is a predetermined dimension such that the nut is allowed to rotate on the strap principal axis 70 while remaining aligned thereon.

With reference to FIG. 2 it will be seen that the nut, washer and strap assemblage 62 is designed to be secured to the rod threaded end 32 with the washer contact surface 79 in abutting relation to the bushing exterior dome-shaped end 56. Thus, upon the nut head end 101 being torqued down the bushings 52 and 54 will be compressed to their design mode shown by bushings 52' and 54'. It will be appreciated that by providing the assemblage 62 an installer can not omit placing the washer 66 on the rod prior to attaching the nut 64 on the threaded end 34. Further, the assemblage 62 assures proper orientation of the washer 66, i.e. washer contact surface 79 abutting the bushing 52.

It will be seen in FIG. 6 that the nut head end 101 is formed with wrench-engagable side surfaces or flanks 110. In the preferred embodiment the nut head end has six flanks providing a hex-head end nut.

Obviously, many variations and modifications of the present invention are possible in light of the above teachings. It is, therefore, to be understood that within the scope of the appended claims, the invention may be practiced otherwise than as specifically described.

What is claimed is:

1. A three element fastener assemblage comprising:
   a nut formed with a threaded bore having a head end and a radially extending annular collar at its other end, a dish-shaped annular washer and a retaining strap wherein the nut and washer are held in aligned relationship by said strap;
   said dish-shaped washer comprising a central base having a concentric through hole, said base defining a seating surface axially depressed from a surrounding radially extending peripheral flange having a facing surface, said flange terminating in a circular edge of predetermined diameter;
   said strap having a longitudinal axis of symmetry with said strap providing one facing surface adapted for flush contact with said washer flange facing surface, said strap formed with a circular aperture the center of which having its principal axis intersecting said strap longitudinal axis;
   said strap, having a predetermined width slightly greater than the diameter of said nut collar, formed with oppositely extending mirror image bifurcated ends defining pairs of washer retention prongs symmetrically disposed about said longitudinal axis, each of said prongs having a distal end having an arcuate shape in cross section, said distal ends establishing four mutually opposed concave surfaces defining an imaginary cylindrical envelope with an axis of curvature aligned with said strap aperture principal axis, and said imaginary cylindrical envelope having a predetermined diameter substantially equal to but slightly larger than said washer edge diameter;
   said nut collar defining an annular stop shoulder, said nut head end sized for journalled reception in said strap aperture a predetermined axial dimension limited by said stop shoulder, such that with said washer circular edge in conforming contact with said concave surfaces resulting in self-centered positioning of said washer on said strap aperture principal axis with said washer flange facing surface positioned in flush contact with said strap facing surface thereby locating said washer seating surface a determined axial dimension from said strap facing surface; and
   each said prong distal end extending about said washer circular edge and retaining said strap and washer in fixed relation resulting in said nut collar being captured in a concentric manner between said strap facing surface and said washer seating surface, thereby enabling rotation of said nut relative to said strap and washer with said nut threaded bore aligned on said strap aperture principal axis.

2. The assemblage as set forth in claim 1 wherein said nut head end is formed with a plurality of flanks.

3. The assemblage as set for in claim 2 wherein said nut head end is a hex-head end having six side flanks.

4. In a wheel suspension for a motor vehicle in which threaded ended rods in communication with wheel supports of wheels of the vehicle are resiliently clamped to a frame of the vehicle by elastomeric bushings secured on ends of the rods by a nut and washer fastener arrangement comprising:
   a three element assemblage including a nut formed with a threaded bore having a hex-head end and a radial collared end, a dish-shaped annular washer and a retaining strap with the nut and washer held in aligned relationship by said strap;

said dish-shaped washer comprising a central base having a concentric through hole, said base defining a seating surface axially depressed from a surrounding radially extending peripheral flange having a facing surface, said flange terminating in a circular edge of predetermined diameter;

said strap having a longitudinal axis of symmetry with said strap providing one facing surface adapted for flush contact with said washer facing surface, said strap provided with a circular aperture the center of which having its principal axis intersecting said strap longitudinal axis;

said strap, having a predetermined width slightly greater than the diameter of said nut collar, formed with oppositely extending minor image bifurcated ends defining two pair of washer retention prongs symmetrically disposed about said longitudinal axis, each of said prongs having a distal end having an arcuate shape in cross section, said distal ends establishing four mutually opposed concave surfaces defining an imaginary cylindrical envelope with its axis aligned with said strap aperture principal axis, said imaginary cylindrical envelope having a predetermined diameter substantially equal to but slightly larger than said washer edge diameter;

said nut collar defining an annular stop shoulder, said head end sized for journalled reception in said strap aperture a predetermined axial dimension limited by said stop shoulder, such that with said washer circular edge in conforming contact with said concave surfaces resulting in self-centering positioning of said washer on said strap aperture principal axis with said washer flange facing surface positioned in flush contact with said strap facing surface thereby locating said washer seating surface a determined axial dimension from said strap facing surface; and said four prong distal end portions extending about said washer circular edge and retaining said strap and said washer in fixed relation resulting in said nut collar being captured in a concentric manner between said strap facing surface and said washer seating surface, thereby enabling rotation of said nut relative to said strap and washer with said nut threaded bore aligned on said strap aperture principal axis.

* * * * *